(12) United States Patent
Fan et al.

(10) Patent No.: US 7,745,026 B2
(45) Date of Patent: Jun. 29, 2010

(54) DIRECT CARBON FUELED SOLID OXIDE FUEL CELL OR HIGH TEMPERATURE BATTERY

(75) Inventors: Qinbai Fan, Chicago, IL (US); Renxuan Liu, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 1291 days.

(21) Appl. No.: 11/231,113

(22) Filed: Sep. 20, 2005

(65) Prior Publication Data
US 2007/0065686 A1    Mar. 22, 2007

(51) Int. Cl.
*H01M 12/06* (2006.01)
*H01M 4/90* (2006.01)
*H01M 8/10* (2006.01)
*H01M 4/02* (2006.01)

(52) U.S. Cl. .............................. 429/15; 429/27; 429/33; 429/50; 429/209; 429/49

(58) Field of Classification Search .................... 429/15, 429/27, 33, 40, 209, 49
See application file for complete search history.

(56) References Cited

U.S. PATENT DOCUMENTS

| | | | | |
|---|---|---|---|---|
| 3,663,182 A | * | 5/1972 | Hamling | ...................... 442/181 |
| 6,183,896 B1 | * | 2/2001 | Horita et al. | ................... 429/30 |
| 7,678,484 B2 | * | 3/2010 | Tao et al. | ....................... 429/27 |
| 2003/0143440 A1 | * | 7/2003 | Tao et al. | ....................... 429/13 |

OTHER PUBLICATIONS

Hawley's Condense Condense Chemical Dictionary, Revised by Sax, 11$^{th}$ Edition, "S" section.*
Cherepy, N.J. et al., "Direct Conversion of Carbon Fuels in a Molten Carbonate Fuel Cell," *Journal of the Electrochemical Society*, 152 (1) A80-A87 (2005).

* cited by examiner

*Primary Examiner*—Patrick Ryan
*Assistant Examiner*—Helen O Conley
(74) *Attorney, Agent, or Firm*—Mark E. Fejer

(57) ABSTRACT

A direct carbon fuel electrochemical device and method for generating electricity. The apparatus includes a solid oxide electrolyte having an anode side and a cathode side. Carbon and at least one metal oxide are provided to the anode side for reaction at the anode and air is provided to the cathode side. At least a portion of the carbon is oxidized and at least a portion of the metal oxide is reduced to a metal or lower oxide metal oxide on the anode side. The metal or lower oxide metal oxide is electrochemically reoxidized with oxygen in the air, thereby generating electricity.

16 Claims, 3 Drawing Sheets

Cathode Side                                Anode Side

DIRECT CARBON FUELED SOLID OXIDE FUEL CELL OR HIGH TEMPERATURE BATTERY

BACKGROUND OF THE INVENTION

1. Field of the Invention

This invention relates to electrochemical devices for generating electricity, in particular, solid oxide fuel cells and high temperature batteries. This invention also relates to solid oxide fuel cells and high temperature batteries utilizing solid carbon directly as a fuel. This invention relates to coal fueled solid oxide fuel cells. This invention also relates to sulfur-tolerant solid oxide fuel cells.

2. Description of Related Art

Fossil fuels including coal, oil and natural gas represent the majority of the world's energy supply, a fact which is likely to be true for the foreseeable future. Notwithstanding, extending the availability of these resources as well as reducing the costs and pollution associated with the use of these resources remain highly desirable objectives, objectives which can be addressed by improvements in the efficiencies of fuel utilization and fuel conversion. Methods and devices for using coal directly to produce electricity have been under investigation for the last 40 years. One prospect for improving fuel conversion efficiency is the direct conversion of carbon fuels in batteries and fuel cells. See Cherepy, N. J. et al., "Direct Conversion of Carbon Fuels in a Molten Carbonate Fuel Cell," *Journal of the Electrochemical Society,* 152 (1) A80-A87 (2005). The main idea is that coal is converted to an electrically conductive form and used in a molten carbonate fuel cell. In this application, the carbon reacts with carbonate ions at the fuel cell anode and oxygen reacts with carbon dioxide at the fuel cell cathode, which reactions are carried out at a temperature of about 800° C. in accordance with the following reactions:

Anode half reaction: $C+CO_3^{2-} \rightarrow 3CO_2+4e^-$
Cathode half reaction: $O_2+2CO_2+4e^- \rightarrow 2CO_3^{2-}$
Overall cell reaction: $C+O_2 \rightarrow CO_2$ However, substantial barriers for achieving a practical carbon/air fuel cell have been encountered. These include blocking of the molten carbonate electrolyte by the build-up of ash, sluggishness of the anode reaction rate, and the high cost of carbon electrode manufacture and the complexity of distribution to the cells. An additional drawback to this fuel cell is that the cathode reaction requires at least double the amount of $CO_2$ than oxygen, which is not possible using normal air as the oxygen source.

SUMMARY OF THE INVENTION

It is, thus, one object of this invention to provide a method and apparatus in which coal is directly used to produce electricity.

It is another object of this invention to provide a method and apparatus for direct conversion of solid carbon fuels in fuel cells which addresses the problems of ash build-up, anode reaction rate sluggishness, high carbon electrode manufacture cost, and complexity of distribution to the cells encountered in conventional fuel cells.

These and other objects of this invention are addressed by an electrochemical device comprising a solid oxide electrolyte having an anode side and a cathode side, an anode electrode disposed on the anode side, a cathode electrode disposed on the cathode side, solid carbon and at least one metal oxide disposed on the anode side, and oxygen disposed on the cathode side. In operation, at least a portion of the solid carbon is oxidized and at least a portion of the at least one metal oxide is reduced to a metal and/or a lower oxide metal oxide and the metal and/or lower oxide metal oxide is electrochemically reoxidized with the oxygen, thereby generating electricity. The reactions associated with this operation, which are carried out at cell temperatures in the range of about 600° to about 650° C., are as follows:

Anode half reaction: $C+2O^{2-} \rightarrow CO_2+4e^-$
Cathode half reaction: $O_2+4e^- \rightarrow 2O^{2-}$
Overall reaction: $C+O_2 \rightarrow CO_2$ Thus, coal carbon is consumed at the anode to generate carbon dioxide and oxygen is consumed at the cathode to generate oxygen ions ($O^{2-}$). In contrast to conventional direct coal conversion fuel cells and batteries, no $CO_2$ is involved in the cathode reaction. The primary difference between the direct coal battery and the direct coal fuel cell of this invention is that the fuel cell uses a continuous feeding anode. The reactant coal mixtures continuously feed the cell and generate electricity.

The benefits derived from the method and apparatus of this invention include reductions in the effect of ash build-up on the electrolyte, because the anode reactant carbon is mixed with a metal oxide, which is an $O^{2-}$ conductor. The ash components in the cell cannot block the transport path of the conductors because of the metal oxide bridge between the carbon and the electrolyte separator. Further benefits include increases in the anode reaction rates due to promotion of the solid carbon oxidation at elevated temperatures by the electrocatalyst of the transition metal oxide and elimination of the need to supply $CO_2$ at the cathode side of the cell.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

The invention disclosed and claimed herein is a direct carbon fuel electrochemical device in the form of a solid oxide fuel cell or high temperature battery. As used herein, the term "high temperature batteries" refers to batteries that are capable of operating at temperatures in the range of operating temperatures of solid oxide fuel cells. Also as used herein, the term "solid carbon" refers to all natural and synthetic substances comprising primarily carbon atoms and having the structure of graphite (graphitic carbon) or having a structure with at least two dimensionally ordered layers of carbon (non-graphitic carbon).

The invention disclosed and claimed herein is a direct carbon fueled solid oxide fuel cell or high temperature battery which is tolerant to impurities in the carbon fuel.

The invention disclosed and claimed herein is a direct carbon fueled solid oxide fuel cell or high temperature battery which is sulfur tolerant. This is of particular significance because it allows for the direct use of coal as a carbon source without first having to remove sulfur that may be present in the coal.

The invention disclosed and claimed herein is a direct carbon fueled solid oxide fuel cell or high temperature battery which is mercury tolerant. This is of particular significance because it allows for the direct use of coal as a carbon source without first having to remove mercury that may be present in the coal.

The key element of this invention is the use of metal oxides in the electrochemical oxidation of the solid carbon. In graphitic carbon, metal intercalation may occur due to the crystalline layer structure of the graphite, possibly reducing the carbon oxidation rate due to shielding of the metal from further reaction. In the case of non-graphitic carbon electrochemical oxidation, the reduced metal from the metal oxide is not attached tightly on the non-crystalline carbon surface, resulting in fast reaction rates. In addition, the use of metal oxides provides for the oxidation of sulfur, mercury and other impurities that may be present in the carbon, such as in carbon from coal, thereby enabling the direct use of the carbon without having to go through a pretreatment step for removal of the impurities.

Figure 1:
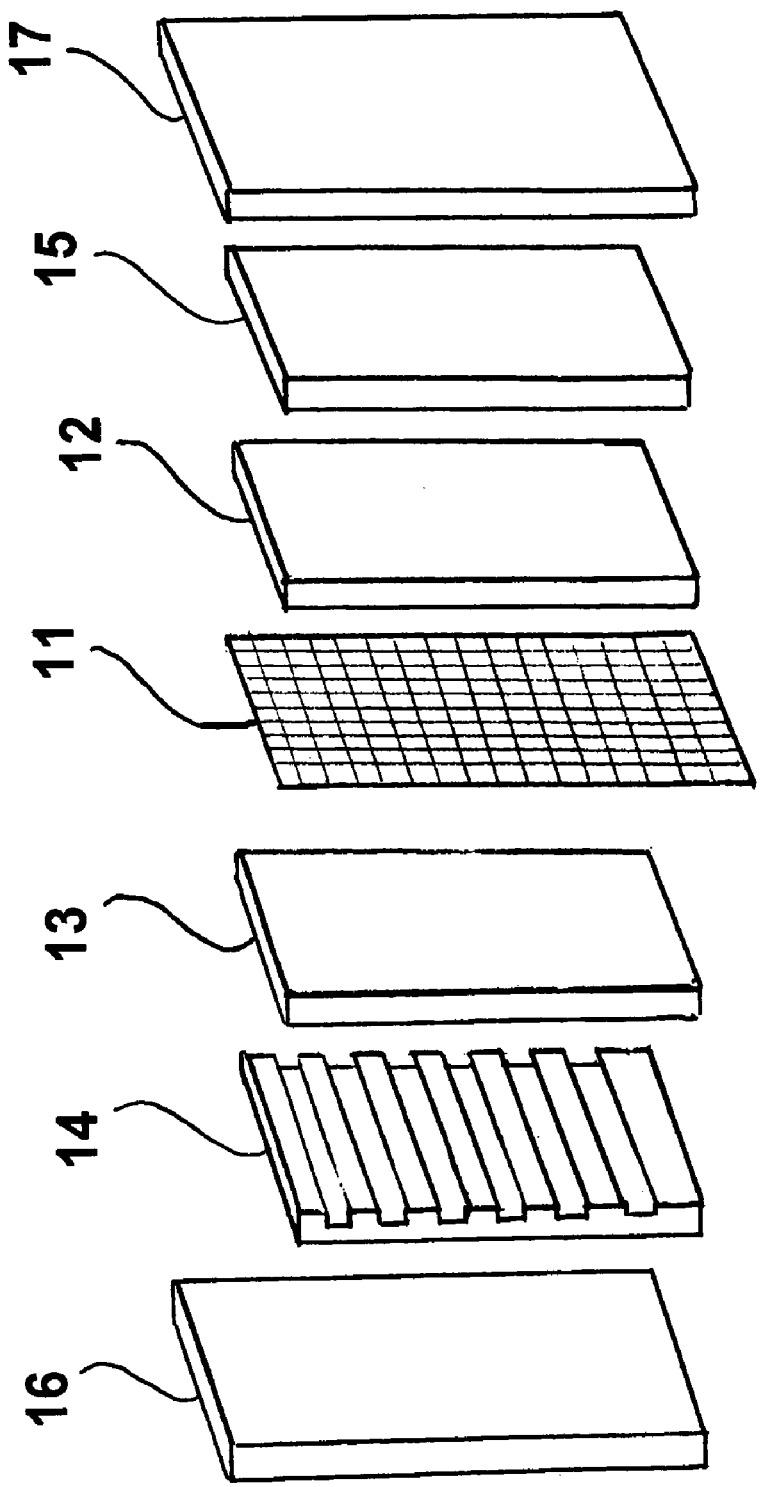
FIG. 1 is an exploded view of a planar direct coal battery in accordance with one embodiment of this invention.

A direct coal carbon battery in accordance with one embodiment of this invention as shown in FIG. 1 comprises a solid oxide electrolyte 11 having an anode side and a cathode side. Disposed on the anode side are anode electrode 12, coal block (carbon) 15 and end plate and current collector 17. Disposed on the cathode side are cathode electrode 13, air feed 14 and end plate and current collector 16. The direct coal carbon battery in accordance with one embodiment of this invention uses coal carbon in contact with an oxygen ion conductor and catalyst. In accordance with one embodiment of this invention, the oxygen ion conductor and/or catalyst constitute part of the anode electrode. Alternatively, the oxygen ion conductor and/or catalyst may be mixed with the coal carbon. It should be understood that any source of solid phase carbon may be employed in the method and apparatus of this invention although coal derived carbon selected from the group consisting of coal, coke, lignite, graphites, and mixtures thereof are preferred.

In accordance with one embodiment of this invention, solid oxide electrolyte 11 comprises a porous zirconia cloth (Zircar Zirconia, Inc., Florida, New York) filled with a metal oxide slurry powder and the cathode electrode comprises nickel foam filled with a metal oxide slurry powder. The metal oxide slurry is applied to the porous zirconia cloth and the nickel foam after which it is dried, leaving behind a metal oxide slurry powder.

In accordance with one embodiment of this invention, the anode comprises a chamber filled with carbon mixed with at least one metal oxide catalyst, such as $MnO_2$. This mixture is very inexpensive and is widely used in Zn—Mn dry battery cathode materials. Other metal oxides suitable for use in this invention include, but are not limited to, oxides of Fe, Ni, Co, Ta, Ti, Ag, Mo, Zr and Y. Preferred metal oxide particle sizes are in the range of about 44 microns to about 250 microns.

In accordance with one embodiment of this invention, the battery is air-breathing at the cathode. That is, no pressurizing devices, such as pumps, are used to transport the air required for reaction to the cathode. In addition, because one side of the electrolyte/separator is a solid phase (carbon) and the other side is a gas phase (air), reactant crossover may be eliminated.

The direct carbon battery and direct carbon fuel cell of this invention are premised upon the oxidation of carbon at the anode using the concept of a solid oxide fuel cell. In the solid oxide fuel cell, the fuel is methane. However, under solid oxide fuel cell operating conditions, carbon is difficult to oxidize, leading to carbon black deposition on the anode catalyst layer. In the method and apparatus of this invention, the use of one or more metal oxide catalysts promotes oxidation of the carbon at elevated temperatures in accordance with the following reactions:

$$C + MO_2 \rightarrow CO + MO \qquad (1)$$

$$MO + C \rightarrow CO + M \qquad (2)$$

We have investigated the use of $MnO_2$, $Y_2O_3$, and $ZrO_2$ as a catalyst oxidation bridge for the oxidation of carbon and we have found that the metal oxide promotes the oxidation reaction. The metal oxides are reduced to metals or to lower oxide metal oxides by the carbon and reoxidized by the oxygen electrochemically:

$$MO + O^{2-} \rightarrow MO_2 + 2e^- \qquad (3)$$

$$M + 2O^{2-} \rightarrow MO_2 + 4e^- \qquad (4)$$

In the entire process, the metal oxides are not consumed.

In accordance with one embodiment of this invention, the anode electrode is porous nickel mixed with $ZrO_2$ and the cathode electrode is porous nickel coated with platinum ink and filled with $ZrO_2$. The platinum on the cathode may increase the oxygen reduction rate. The platinum ink is applied to the electrode using a dip coating technique. In accordance with one embodiment of this invention, the platinum ink is made by mixing 70% (w/w) Pt black, available from Aldrich Chemical, with 30% NAFION® (5% NAFION emulsion from DuPont).

Figure 2:
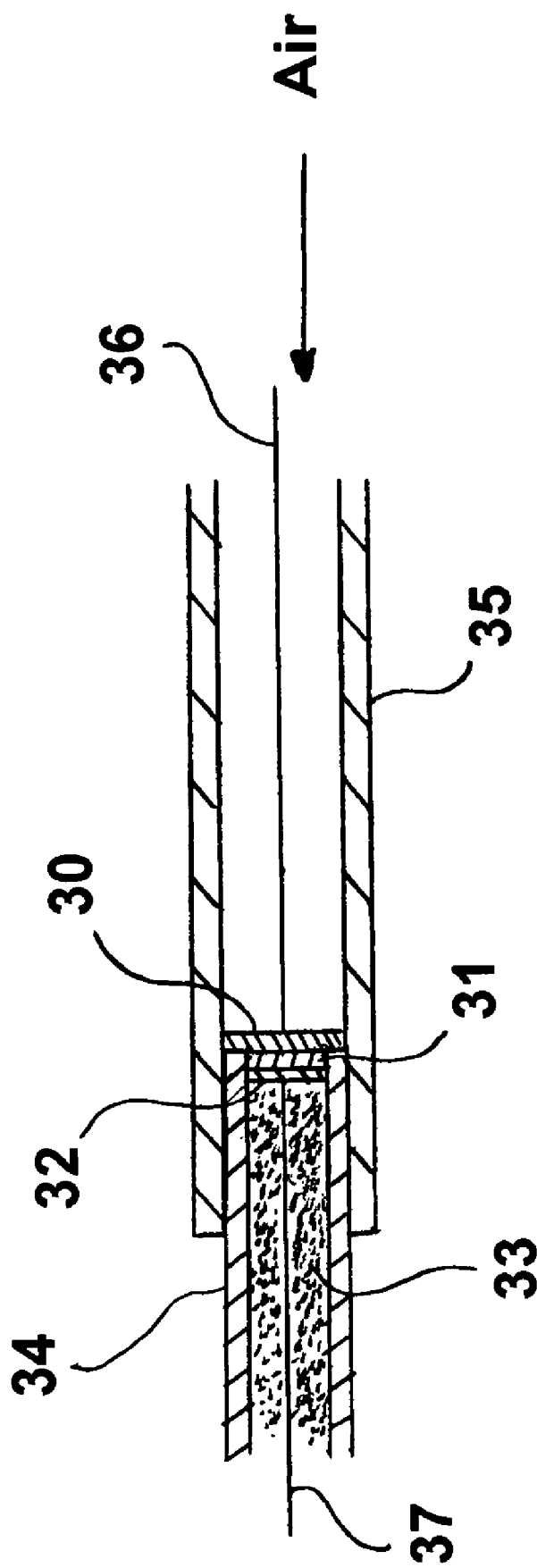
FIG. 2 is a cross-sectional diagram of an experimental tubular direct coal fuel cell employed for proving the concept of this invention.

Proof of the direct carbon battery and direct carbon fuel cell concept of this invention was verified using the test assembly shown in FIG. 2. Anode and cathode electrodes 32 and 30, respectively, as shown in FIG. 2, made of nickel foam or perforated nickel were spot welded to the end of a stainless steel wire 37, 36. The anode electrode 32 was inserted into a small ceramic tube 34, which was then filled with a mixture 33 of carbon black or graphite (about 1 to about 103 microns in size) and about 5% by weight metal oxides. The cathode electrode 30 was inserted into a larger diameter ceramic tube 35 having an inside diameter sized to snugly accommodate insertion of the anode electrode and small ceramic tube. A solid oxide electrolyte/separator 31 comprising a porous $ZrO_2$ cloth filled with a dried metal oxide slurry was positioned so as to be disposed between the anode electrode 32 and the cathode electrode 30 upon insertion of the anode end of the small ceramic tube into the larger diameter ceramic tube, as shown in FIG. 2. As air was supplied to the cathode side of the electrolyte/separator, the test assembly was heated and cell voltage measured.

Figure 3:
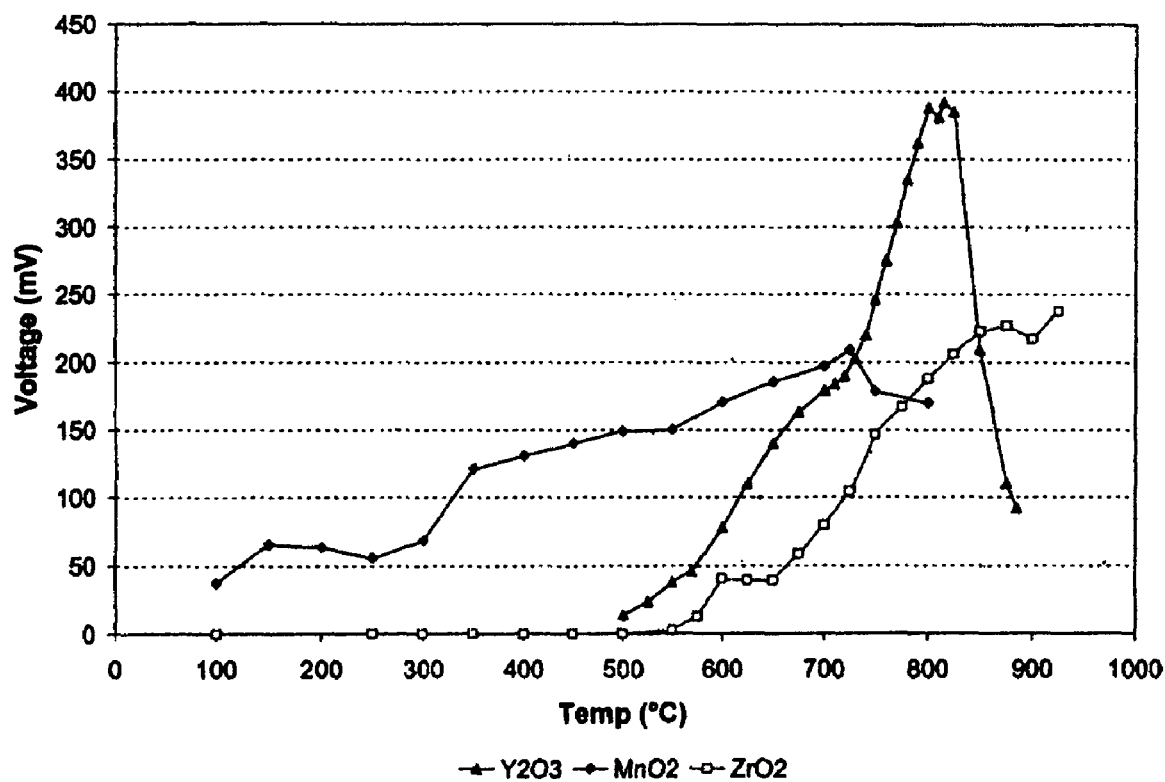
FIG. 3 is a diagram showing the effects of using different metal oxides on direct carbon battery voltage versus cell temperature with a direct carbon battery in accordance with one embodiment of this invention.

The results, shown in FIG. 3, indicate the ability of the direct carbon electrochemical device of this invention to operate at temperatures above 650° C. The results also show the impact of different metal oxides on the operation of the device. In particular, when $MnO_2$ is employed as the metal oxide, carbon oxidation initiates at a substantially lower temperature than when either $Y_2O_3$ or $ZrO_2$ are employed as metal oxides. However, cell performance is substantially improved using either $Y_2O_3$ or $ZrO_2$ as the metal oxide compared to using $MnO_2$ as the metal oxide.

As previously indicated, the primary difference between the high temperature battery and direct carbon fueled solid oxide fuel cell of this invention is that the carbon is continuously fed to the anode in the fuel cell application. It will be appreciated by those skilled in the art that there are numerous ways in which the carbon may be continuously fed to the anode. For example, the fuel cell may be provided with an external fuel manifold into which the carbon is dropped by gravity from a suitably placed feed bin or hopper. The carbon may then be transmitted by means of a screw feeder or other similar conveyance device to the anode.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. In an electrochemical device having a solid oxide electrolyte having an anode side and a cathode side, a method for generating electricity comprising the steps of:
   providing a mixture of solid carbon fuel and at least one metal oxide to said anode side of said solid oxide electrolyte;
   providing oxygen to said cathode side of said solid oxide electrolyte;
   oxidizing at least a portion of said solid carbon fuel and reducing at least a portion of said metal oxide to at least one of a metal and a lower oxide metal oxide; and
   electrochemically reoxidizing said at least one of said metal and said lower oxide metal oxide with said oxygen, thereby generating electricity.

2. A method in accordance with claim 1, wherein said solid carbon fuel is selected from the group consisting of coal, coke, lignite, graphites and mixtures thereof.

3. A method in accordance with claim 1, wherein said at least one metal oxide is selected from the group consisting of $MnO_2$, $Y_2O_3$, $ZrO_2$, and mixtures thereof.

4. A method in accordance with claim 1, wherein said solid carbon fuel is continuously provided to said anode side of said solid oxide electrolyte.

5. A method in accordance with claim 1, wherein said solid oxide electrolyte comprises a porous zirconia cloth.

6. A method in accordance with claim 5, wherein said solid oxide electrolyte further comprises a metal oxide slurry powder.

7. A method in accordance with claim 1, wherein said oxidation and reduction are carried out at a temperature in a range of about 600° to about 900° C.

8. A method in accordance with claim 1, wherein said solid carbon fuel is oxidized to form carbon dioxide and said oxygen is consumed on said cathode side to generate $O^{2-}$.

9. A method in accordance with claim 1, wherein said electrochemical device is air-breathing on said cathode side.

10. A method in accordance with claim 1, wherein said solid carbon fuel comprises at least one impurity.

11. A method in accordance with claim 1, wherein said solid carbon fuel comprises at least one of sulfur and mercury.

12. In an electrochemical device comprising a solid oxide electrolyte having an anode side and a cathode side, a method for generating electricity comprising the steps of:
    providing a mixture of solid carbon fuel and at least one metal oxide to said anode side of said solid oxide electrolyte;
    oxidizing said solid carbon fuel and reducing said at least one metal oxide to one of a metal and a lower oxide metal oxide on said anode side of said solid oxide electrolyte; and
    electrochemically reoxidizing said one of said metal and said lower oxide metal oxide with oxygen from said cathode side, thereby generating electricity.

13. A method in accordance with claim 12, wherein said solid carbon fuel is selected from the group consisting of coal, coke, lignite, graphites, chars, and mixtures thereof.

14. A method in accordance with claim 12, wherein said at least one metal oxide is an oxide of a metal selected from the group consisting of Fe, Ni, Co, Ta, Ti, Ag, Mn, Mo, Zr, Y, and mixtures thereof.

15. A method in accordance with claim 12, wherein said solid oxide electrolyte comprises a porous zirconia cloth and a metal oxide slurry.

16. A method in accordance with claim 12, wherein said solid carbon fuel is continuously fed to said anode side.

* * * * *